(12) United States Patent
Maehara (10) Patent No.: US 6,900,618 B2
(45) Date of Patent: May 31, 2005

(54) POWER GENERATION CONTROL APPARATUS FOR VEHICLE

(75) Inventor: Fuyuki Maehara, Nagoya (JP)

(73) Assignee: Denso Corporation, Kariya (JP)

( * ) Notice: Subject to any disclaimer, the term of this patent is extended or adjusted under 35 U.S.C. 154(b) by 146 days.

(21) Appl. No.: 10/384,600

(22) Filed: Mar. 11, 2003

(65) Prior Publication Data
US 2003/0178973 A1 Sep. 25, 2003

(30) Foreign Application Priority Data
Mar. 20, 2002 (JP) ........................................ 2002-077471

(51) Int. Cl.⁷ ............................ H02H 7/06; H02H 7/08; H02P 9/42
(52) U.S. Cl. ............................ 322/28; 322/27; 322/25; 322/61; 290/31; 290/32; 290/46
(58) Field of Search ............................... 322/25, 27–28, 322/61; 290/31–32, 46

(56) References Cited

U.S. PATENT DOCUMENTS

| | | | | |
|---|---|---|---|---|
| 3,902,073 A | * | 8/1975 | Lafuze | 290/46 |
| 3,908,130 A | * | 9/1975 | Lafuze | 290/46 |
| 4,330,743 A | * | 5/1982 | Glennon | 322/10 |
| 4,481,459 A | * | 11/1984 | Mehl et al. | 322/10 |
| 4,636,706 A | | 1/1987 | Bowman et al. | 322/28 |
| 4,841,216 A | * | 6/1989 | Okada et al. | 322/10 |
| 5,319,299 A | | 6/1994 | Maehara | 322/28 |
| 5,418,446 A | * | 5/1995 | Hallidy | 322/28 |
| 5,663,631 A | * | 9/1997 | Kajiura et al. | 322/29 |
| 5,731,689 A | * | 3/1998 | Sato | 322/25 |
| 5,880,533 A | * | 3/1999 | Arai et al. | 290/31 |
| 6,049,196 A | * | 4/2000 | Arai et al. | 322/61 |
| 6,420,855 B2 | * | 7/2002 | Taniguchi et al. | 322/28 |
| 6,455,946 B2 | * | 9/2002 | Taniguchi | 290/32 |
| 6,696,773 B2 | * | 2/2004 | Taniguchi | 307/153 |
| 6,734,653 B2 | * | 5/2004 | Taniguchi et al. | 322/24 |
| 6,812,675 B2 | * | 11/2004 | Okamoto et al. | 322/28 |
| 6,815,933 B2 | * | 11/2004 | Taniguchi et al. | 322/28 |

* cited by examiner

Primary Examiner—Darren Schuberg
Assistant Examiner—Pedro J. Cuevas
(74) Attorney, Agent, or Firm—Oliff & Berridge, PLC (57) ABSTRACT

A vehicle power generation control apparatus that has a power supply circuit, a rotation detecting circuit, an exciting current detecting circuit, an exciting current control circuit, a torque detecting/maximum exciting current determining circuit and a power transistor. When a speed of rotation of a vehicle generator is detected by the rotation detecting circuit and an exciting current flowing through an exciting winding of the vehicle generator is detected by the exciting current detecting circuit, the torque detecting/maximum exciting current determining circuit calculates an upper limit value of the exciting current so that a rate of change of a generator torque does not exceed a predetermined value, and the exciting current control circuit controls the exciting current so that the exciting current becomes below the limit value. This can prevent the engine revolution from becoming unstable due to variation of load or variation of engine revolution.

5 Claims, 6 Drawing Sheets

POWER GENERATION CONTROL APPARATUS FOR VEHICLE

BACKGROUND OF THE INVENTION

1) Field of the Invention

The present invention relates to a power generation control apparatus for use in a motor vehicle, designed to control an output voltage of a generator for the vehicle by controlling its exciting current.

2) Description of the Related Art

A generator for use in a motor vehicle is for the purpose of charging a battery for replenishment while the vehicle is in a running condition and of providing electric power to various types of electrical equipment including ignition in an engine, illumination, and others, and a power generation control apparatus is connected thereto for maintaining an approximately constant output voltage even if the state of each of the electrical loads (current consumers) varies. In particular, recently, there is a tendency that the power generation torque of the vehicle generator increases with an increase in electrical load. When the power generation torque of the vehicle generator reaches an excessive value at the connection to an electrical load(s), the rotational operation of the engine becomes unstable, and for this reason, there has been known a technique to avoid such a situation through the implementation of gradually exciting control in which a power generation control apparatus increase an exciting current step by step.

For example, Japanese Patent Laid-Open No. SHO 62-064299 discloses a technique to suppress a rapid increase of the power generation torque by gradually increasing an exciting current for a vehicle generator, thereby preventing a reduction of the engine speed stemming from the rapid increase of the power generation torque of the vehicle generator when an electrical load is put into operation in an idling condition.

Meanwhile, in the recent years, there has been a tendency to lower the torque through the employment of various types of computerized auxiliary devices for the improvement of fuel consumption, while there has been an increasing requirement for higher output of the vehicle generator, and the movements of the power generation have exerted great influence on the variation of the engine revolution in an idling condition. For this reason, there arises a problem, however, in that the employment of only the method of varying the exciting current gradually through the use of the conventional technique disclosed in the above-mentioned publication cannot sufficiently prevent the engine revolution from being unstable. For example, in a case in which the engine revolutions lower rapidly due to some disturbance, the drive torque generated from the engine drops, while the power generation state of the vehicle generator having no load fluctuation is maintainable and the power generation torque increases, thus developing a reduction of the engine revolution and producing unstable engine revolution.

SUMMARY OF THE INVENTION

The present invention has been developed in consideration of such situations, and it is therefore an object of the invention to provide a power generation control apparatus for use in a motor vehicle, capable of preventing unstable engine revolutions stemming from load fluctuations and engine revolution variation.

For this purpose, in accordance with the present invention, for controlling an output voltage of a vehicle generator by interrupting a current supply to an exciting winding of the vehicle generator, there is provided a power generation control apparatus for use in a vehicle, comprising exciting current detecting means for detecting an exciting current flowing through the exciting winding, rotation speed detecting means for detecting a speed of rotation of the generator, torque calculating means for calculating a power generation torque of the generator as a function of the exciting current detected by the exciting current detecting means and the rotation speed detected by the rotation speed detecting means, and exciting current control means for controlling the exciting current to the exciting winding so that a rate of change of the power generation torque calculated by the torque calculating means does not exceed a predetermined value. Thus, even in a case in which a fluctuation of the electrical load or a variation of the engine revolution occurs, the increasing quantity of the power generation torque of the vehicle generator is suppressible to be below a given value, thereby preventing the engine revolution from becoming unstable due to an increase in power generation torque.

In addition, preferably, the aforesaid exciting current control means controls the supply of the exciting current to the exciting winding when an engine of the vehicle is an idling condition. Although the engine revolution tends to become most frequently unstable in the idling condition in which the engine speed lowers, owing to the suppression of the rapid increase of the power generation torque, the stabilization of the engine revolution becomes feasible in the idling condition. In particular, the realization of the stabilization of the engine revolution enables further lowering the engine speed in the idling condition and achieves further improvement of fuel consumption.

Still additionally, preferably, the aforesaid exciting current control means does not implement the control on the exciting current to the exciting winding when an output voltage of the vehicle generator does not reach a set value. Since the output voltage of the vehicle generator below a predetermined set value signifies that the electrical load is large, there is a possibility of the occurrence of malfunctions of the electrical load when limitation is imposed on the exciting current to lower the power generation quantity so that the output voltage thereof further drops. Accordingly, in such a case, no control is implemented to suppress the power generation torque, thereby preventing the malfunctions of the electrical load stemming from a drop of the output voltage thereof.

Yet additionally, preferably, the aforesaid torque calculating means has an at-least-once-data-writable non-volatile memory storing a table showing the relationship among an exciting current, a rotation speed and a power generation torque. The employment of this table can simplify the processing for the calculation of the power generation torque. Moreover, even in a case in which the power generation control apparatus for a vehicle according to the present invention is put for use in a plurality of types of vehicle generators, this configuration of the torque calculating means is also applicable thereto. For meeting this requirement, a table made to the specification of each of the vehicle generators is written in the non-volatile memory. This allows a combination of one type of vehicle power generation control apparatus with a plurality of different vehicle generators, thus achieving the cost reduction and enabling the labor-saving on the product management.

BRIEF DESCRIPTION OF THE DRAWINGS

Other objects and features of the present invention will become more readily apparent from the following detailed description of the preferred embodiment taken in conjunction with the accompanying drawings in which.

DESCRIPTION OF THE PREFERRED EMBODIMENTS

Referring to the drawings, a description will be given hereinbelow of a power generation control apparatus for use in a motor vehicle according to an embodiment of the present invention.

Figure 1:
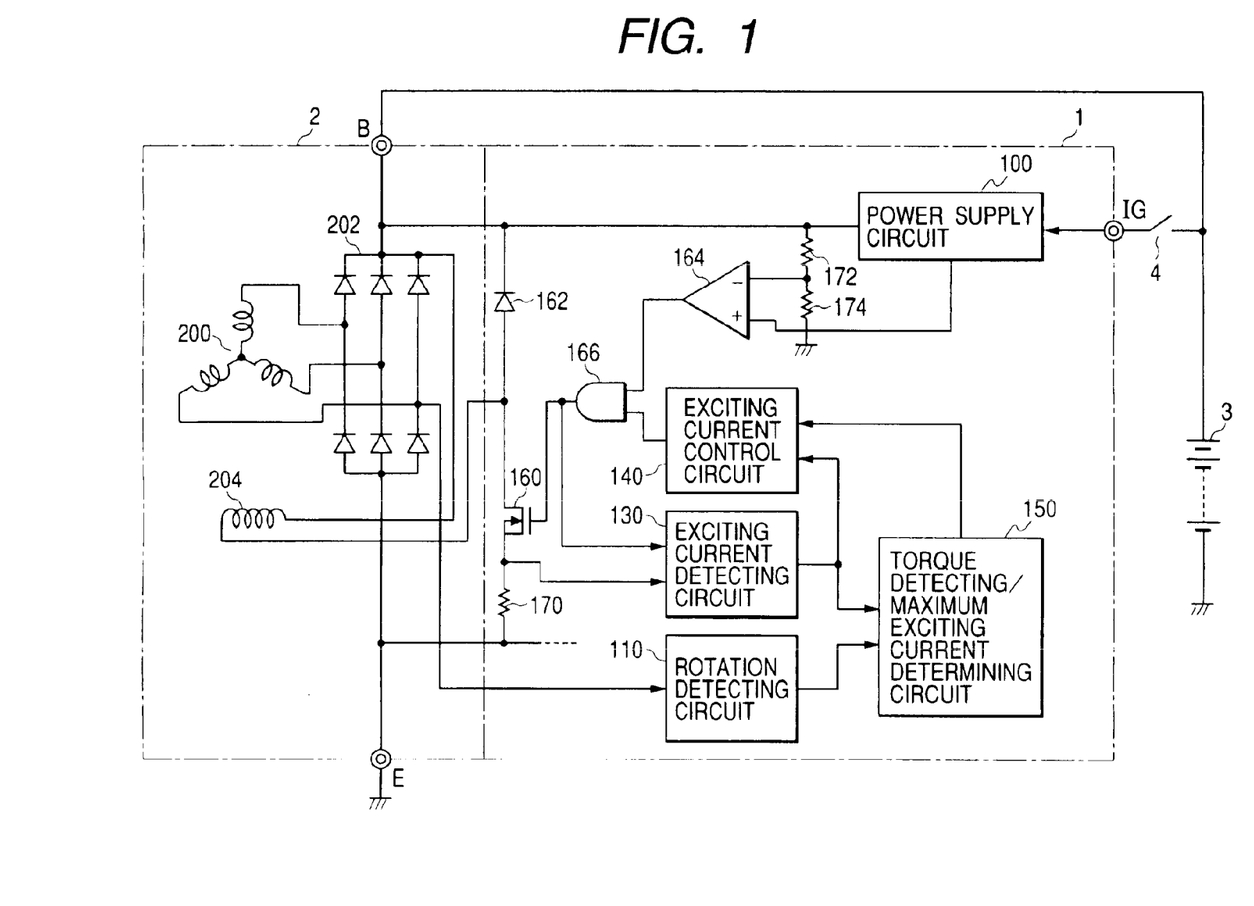
FIG. 1 is an illustration of an arrangement of a power generation control apparatus for use in a motor vehicle according to an embodiment of the present invention.

FIG. 1 is an illustration of an arrangement of the vehicle power generation control apparatus according to the embodiment of the present invention, showing a connection state of the vehicle power generation control apparatus with a vehicle generator and a battery.

In FIG. 1, the vehicle power generation control apparatus, generally designated at reference numeral 1, is for implementing control so that a voltage at an output terminal (terminal B) of a generator 2 for use in a motor vehicle becomes a predetermined regulated set voltage value (for example, 14V). Moreover, the vehicle power generation control apparatus 1, in addition to the terminal B, has a power supply terminal (terminal IG) and a ground terminal (terminal E). The terminal IG is connected through a key switch 4 to a battery 3, while the terminal E is connected to a frame of the vehicle generator 2.

The vehicle generator 2 is made up of a three-phase stator winding 200 included in a stator, a rectification circuit 202 for full-wave-rectifying the three-phase output of the stator winding 200, and an exciting winding 204 included in a rotor. The control of the output voltage of the vehicle generator 2 is based upon the proper interruption control of the current supply to the exciting winding 204 by the vehicle power generation control apparatus 1. The terminal B of the vehicle generator 2 is connected to the battery 3 to feed a charging current through the terminal B to the battery 3.

Secondly, a description will be given hereinbelow of a detailed arrangement of the vehicle power generation control apparatus 1 and an operation thereof.

As FIG. 1 shows, the vehicle power generation control apparatus 1 is made up of a power supply circuit 100, a rotation detecting circuit 110, an exciting current detecting circuit 130, an exciting current control circuit 140, a torque detecting/maximum exciting current determining circuit 150, a power transistor 160, a reflux diode 162, a voltage comparator 164, an AND circuit 166, and resistors 170, 172 and 174.

The power supply circuit 100 produces a predetermined operating voltage in response to a battery voltage being applied to the terminal IG. The rotation detecting circuit 110 monitors a phase voltage developing at any one of the phases of the stator winding 200 to detect a speed of rotation of the vehicle generator 2. The exciting current detecting circuit 130 detects an exciting current flowing in the exciting winding 204 on the basis of an electric potential at a source side one terminal of the power transistor 160 composed of an N-channel MOS-FET. The resistor 170, serving as a sense resistor for the detection of the exciting current, is connected to the source side of the power transistor 160, and in the exciting current detecting circuit 130, the detection of an exciting current is made on the basis of a terminal voltage of the resistor 170 appearing when the exciting current flows between the source and drain of the power transistor 160 and through the resistor 170.

The exciting current control circuit 140 produces an exciting current control signal so that the exciting current to be detected by the exciting current detecting circuit 130 becomes below a predetermined maximum exciting current value (exciting current MAX value). The torque detecting/maximum exciting current determining circuit 150 estimates a power generation torque (or drive torque) of the vehicle generator 2 (which will be referred to hereinafter as a "generator torque") on the basis of a speed of rotation of the vehicle generator 2 detected by the rotation detecting circuit 110 and an exciting current detected by the exciting current detecting circuit 130, and determines a maximum exciting current value forming an allowable upper limit value of the exciting current at that time for limiting the increase in the generator torque.

The power transistor 160 is connected in series to the exciting wining 204, and when being in an on-condition, it allows an exciting current to flow through the exciting winding 204. The reflux diode 162 is connected in parallel with the exciting winding 204, and when the power transistor 160 is in an off-condition, it refluxes the exciting current. The voltage comparator 164 receives, at its minus terminal, a voltage obtained by dividing the output voltage of the vehicle generator 2 through the use of a voltage division circuit comprising the resistors 172 and 174 and further receives, at its plus terminal, a reference voltage developed by the power supply circuit 100, thus making a comparison between the voltage applied to the plus terminal and the voltage applied to the minus terminal. When the divided voltage developed according to the output voltage of the vehicle generator 2 becomes lower than the reference voltage, that is, if the output voltage of the vehicle generator 2 becomes lower than a predetermined regulated set voltage value, the output signal of the voltage comparator 164 is placed into a high level.

The AND circuit 166 receives an exciting current control signal outputted from the exciting current control circuit 140 and an output signal from the voltage comparator 164, and outputs a drive signal forming a logical product of these signals. The output terminal of the AND circuit 166 is connected to the gate of the power transistor 160, and when the drive signal outputted from the AND circuit 166 turns to a high level, the power transistor 160 is placed into the on-condition.

Figure 2:
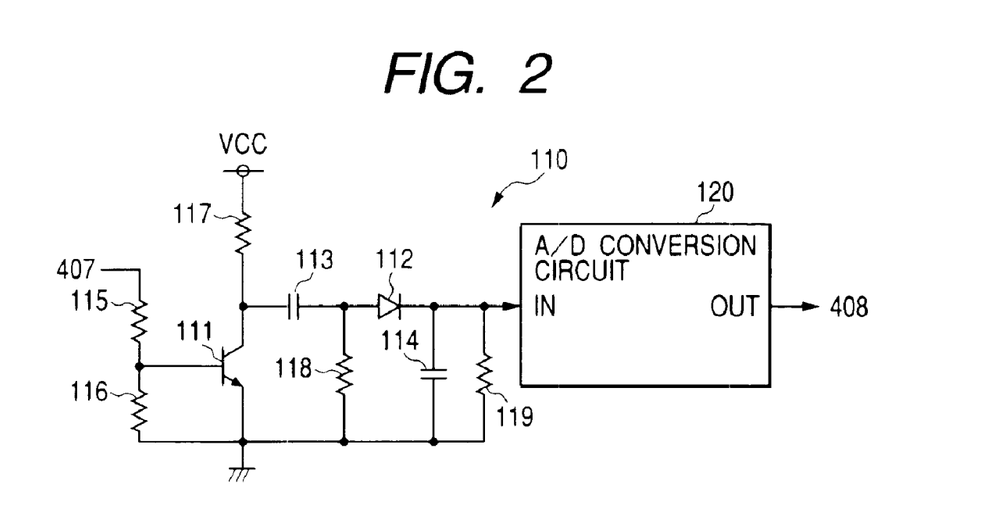
FIG. 2 is an illustration of a detailed arrangement of a rotation detecting circuit shown in FIG. 1.

FIG. 2 is an illustration of a detailed arrangement of the rotation detecting circuit 100. As shown in FIG. 2, the rotation detecting circuit 100 is composed of a transistor 111, a diode 112, capacitors 113 and 114, resistors 115 to 119, and an A/D (Analog-Digital) conversion circuit 120. One of the phase voltages of the stator winding 200 is divided by a voltage division circuit comprising the resistors 115 and 116 and is applied to the base of the transistor 111. The transistor 111 and the resistor 117 connected to the collector side thereof constitute a waveform shaping circuit, and a signal obtained by shaping the phase voltage waveform is outputted from the collector of the transistor 111. This signal is inputted to a differentiating circuit comprising the capacitor 113 and the resistor 118, and the differentiated output is rectified by the diode 112 and is then inputted to a charging/discharging circuit comprising the capacitor 114 and the resistor 119. The above-mentioned arrangement produces a voltage proportional to the frequency of the phase voltage of the stator winding 200, with the produced voltage being inputted to the A/D conversion circuit 120. The A/D conversion circuit 120 converts the inputted voltage into digital data with a predetermined number of bits (for example, 8 bits).

Figure 3:
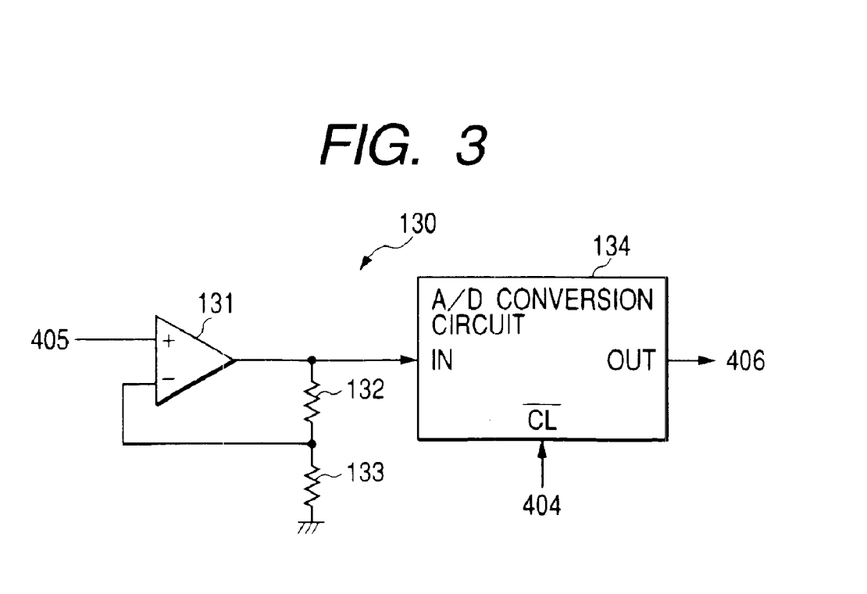
FIG. 3 is an illustration of a detailed arrangement of an exciting current detecting circuit shown in FIG. 1.

FIG. 3 is an illustration of a detailed arrangement of the exciting current detecting circuit 130. As shown in FIG. 3, the exciting current detecting circuit 130 is composed of an operational amplifier 131, resistors 132, 133, and an A/D conversion circuit 134. The operational amplifier 131 and the two resistors 132, 133 constitute an amplifier having a predetermined amplification factor which is determined by the resistances of the two resistors 132 and 133, where an inputted voltage having a value corresponding to the exciting current is amplified and outputted therefrom. The A/D conversion circuit 134 receives, at its input terminal (IN), an output signal from that amplifier and receives, at its clock terminal (CL), a drive signal outputted from the AND circuit 166 in a negative logic fashion. It takes in the output voltage of the former-stage amplifier at the timing that the drive signal is switched from the high level to the low level, and converts it into digital data (exciting current value) with a predetermined number of bits (for example, 8 bits).

Figure 4:
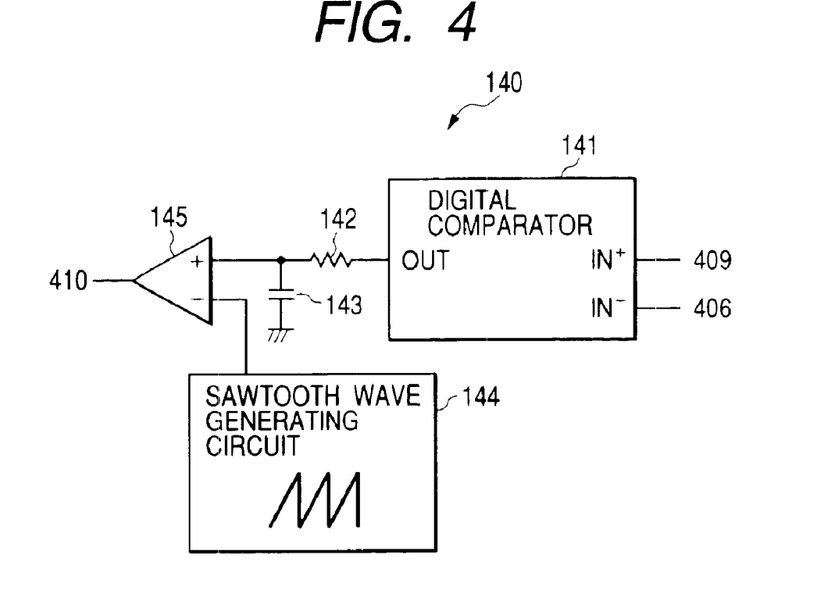
FIG. 4 is an illustration of a detailed arrangement of an exciting current control circuit shown in FIG. 1.

FIG. 4 is an illustration of a detailed arrangement of the exciting current control circuit 140. As shown in FIG. 4, the exciting current control circuit 140 is composed of a digital comparator 141, a resistor 142, a capacitor 143, a sawtooth wave generating circuit 144 and a voltage comparator 145. The digital comparator 141 compares a maximum exciting current value inputted from the torque detecting/maximum exciting current determining circuit 150 to its one input terminal (IN+) with an exciting current value inputted from the exciting current detecting circuit 130 to its other input terminal (IN−), and when the maximum exciting current value is larger than the exciting current value, outputs a signal with a high level. This outputted signal is inputted to a smoothing circuit comprising the resistor 142 and the capacitor 143 to be smoothed and then is inputted to the plus terminal of the voltage comparator 145. This voltage comparator 145 receives, at its minus terminal, a sawtooth wave signal outputted from the sawtooth wave generating circuit 144 and receives, at its plus terminal, the smoothed voltage, and makes a comparison therebetween, thereby outputting a PWM signal with a duty ratio corresponding to the comparison result.

Figure 5:
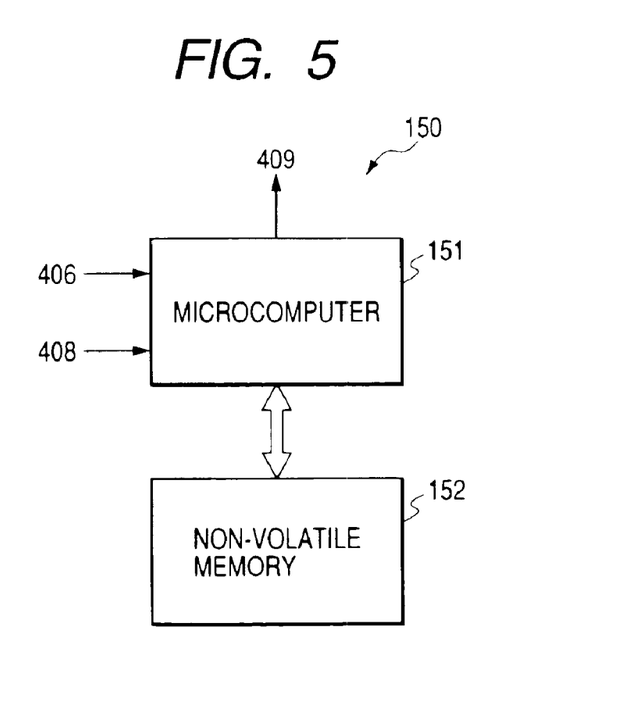
FIG. 5 is an illustration of a detailed arrangement of a torque detecting/maximum exciting current determining circuit shown in FIG. 1.

FIG. 5 is an illustration of a detailed arrangement of the torque detecting/maximum exciting current determining circuit 150. As shown in FIG. 5, the torque detecting/maximum exciting current determining circuit 150 includes a microcomputer 151 and a non-volatile memory 152. The microcomputer 151 receives a speed of rotation of the vehicle generator 2, detected by the rotation detecting circuit 110 and further receives an exciting current value detected by the exciting current detecting circuit 130, and executes a predetermined program to calculate a generator torque with reference to a calculation table stored in the non-volatile memory 152 and further to determine a maximum exciting current value for imposing a limitation so that a rate of increase of the generator torque does not exceed a set value. The above-mentioned calculation table includes the relationship among an exciting current If, a speed N of rotation of the vehicle generator 2, an output voltage $V_B$ and a generator torque T. The employment of this calculation table enables the calculation of a corresponding generator torque T knowing an exciting current If, a speed N of rotation and an output voltage $V_B$, and permits the calculation of a corresponding exciting current If knowing a speed N of rotation, an output voltage $V_B$ and a generator torque T. Since the calculation equation for the generator torque varies according to the specification of the vehicle generator 2, for example, it is written in the non-volatile memory 152 at the inspections of the vehicle generator 2 or the vehicle power generation control apparatus 1, or the like. Incidentally, in a case in which the calculation table is written to the specification of the vehicle generator 2 in this way, the non-volatile memory 152 is required to allow data to be written at least once.

Figure 6:
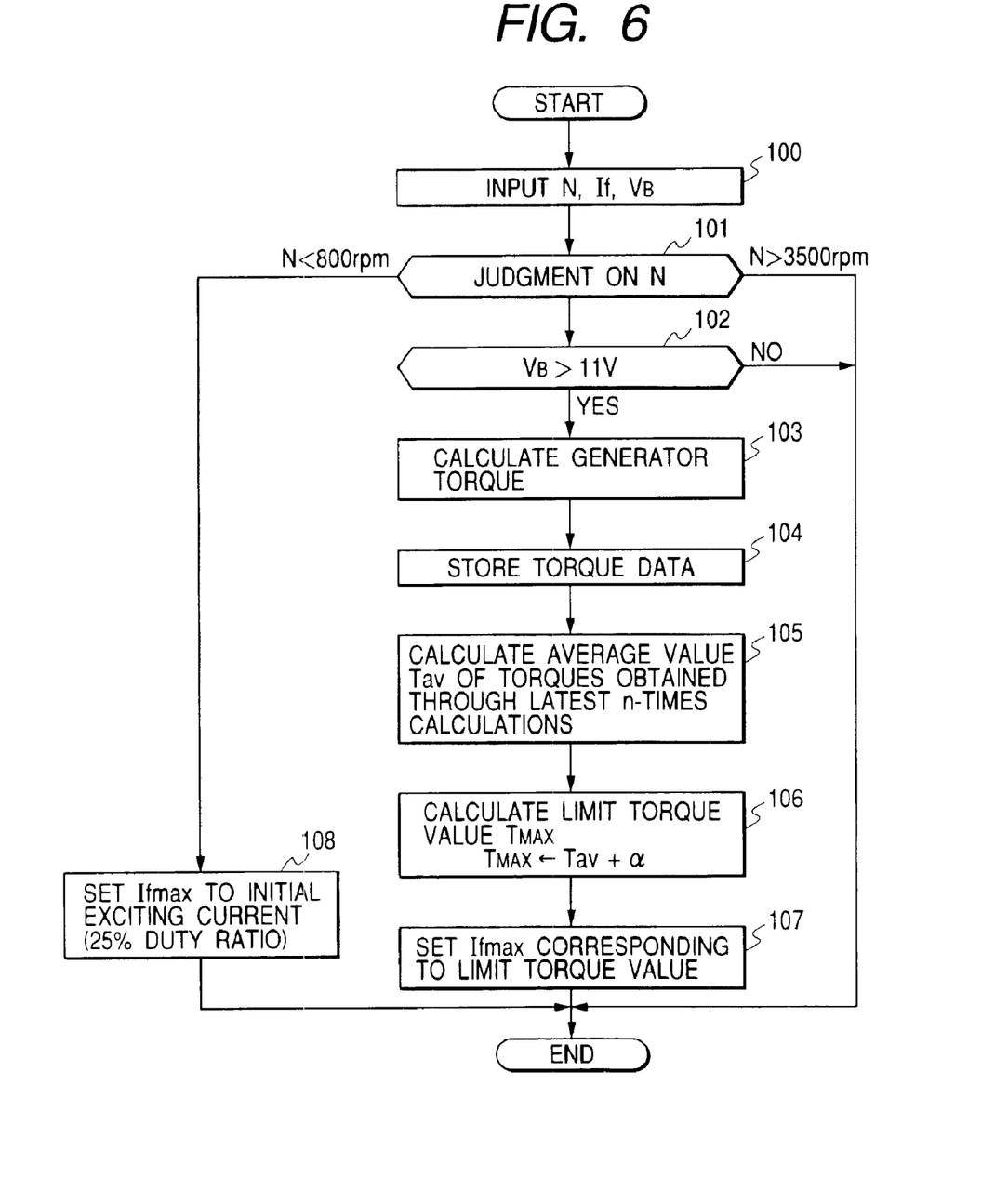
FIG. 6 is a flow chart showing an operational procedure of the torque detecting/maximum exciting current determining circuit using a microcomputer shown in FIG. 5.

FIG. 6 is a flow chart showing an operational procedure of the torque detecting/maximum exciting current determining circuit 150 using the microcomputer 151 shown in FIG. 5.

When an exciting current If, a speed N of rotation and an output voltage $V_B$ are inputted at a predetermined timing (for example, at an interval of 5 msec) (step 100), the microcomputer 151 makes a judgment on the contents of the rotation speed N (step 101), and if the rotation speed N is in a range between 800 and 3500 rpm, further makes a judgment as to whether or not the output voltage $V_B$ is higher than 11V (step 102). If the output voltage $V_B$ is higher than 11V, an affirmative judgment takes place. Subsequently, the microcomputer 151 calculates a generator torque T corresponding to the inputted exciting current If, rotation speed N and output voltage $V_B$ on the basis of a calculation table stored in the non-volatile memory 152 (step 103) and puts it in its own built-in RAM (step 104). Moreover, the microcomputer 151 calculates an average value Tav of the torques obtained by the latest n-times calculations and preserved in the built-in RAM (step 105) and adds an increasing quantity α to the average value Tav to obtain a limit torque value Tmax (step 106) for calculating an exciting current limiting value Ifmax corresponding to this limit torque value Tmax by referring to the calculation table stored in the non-volatile memory 152 (step 107). This exciting current limiting value Ifmax is inputted as a maximum exciting current value from the torque detecting/maximum exciting current determining circuit 150 to the exciting current control circuit 140. Still moreover, if the rotation speed N of the vehicle generator 2 is lower than 800 rpm, that is, when the engine is considered to be in a stopping condition, a maximum exciting current value corresponding to the exciting current If, whereby the duty ratio becomes 25%, is set (step 108). On the other hand, if the rotation speed N of the vehicle generator 2 is higher than 3500 rpm, since it is considered that the engine revolution resides in a stable area, the above-mentioned generator torque suppression control is not implemented.

The aforesaid exciting current detecting circuit 130, rotation detecting circuit 110, torque detecting/maximum exciting current determining circuit 150 and exciting current control circuit 140 correspond to exciting current detecting means, rotation speed detecting means, torque calculating means and exciting current control means, respectively.

The vehicle power generation control apparatus 1 according to this embodiment has the arrangement described above, and a description will be given hereinbelow of a control operation thereof.

(1) Before Starting of Engine

When the key switch 4 is operated by a driver to be placed into the on-condition, the power supply circuit 100 produces an operating voltage so that the vehicle power generation control apparatus 1 initiates the control operation.

In a case in which the vehicle generator 2 is in a non-rotating state before the starting of the engine, since the power generation is not made by the vehicle generator 2, the terminal voltage of the battery 3 is approximately 12V lower than a predetermined regulated voltage (for example, 14V) so that the output signal of the voltage comparator 164 becomes the high level.

In addition, since the rotation speed N of the vehicle generator 2 is lower than 800 rpm before the starting of the engine, the torque detecting/maximum exciting current determining circuit 150 outputs a maximum exciting current value corresponding to the duty ratio of 25% and the power transistor 160 is placed into an interrupted condition so that the duty ratio of the flowing exciting current is controlled to 25%, thereby setting an initial exciting state.

(2) In Idling Condition

When the key switch 4 is further manipulated up to the engine starting position to rotate the starter for starting the engine and the rotation speed N of the vehicle generator 2 increases up to the idling revolutions of the engine, the power generation starts. If the rotation speed N of the vehicle generator 2 reaches approximately 2000 rpm, the release from the above-mentioned initial exciting state takes place, and the torque detecting/maximum exciting current determining circuit 150 initiates the torque suppression control. That is, on the basis of an exciting current If, a rotation speed N and an output voltage $V_B$, there is determined a limit torque value Tmax (=Tav+$\alpha$), i.e., a maximum exciting current value, corresponding to an average value Tav of the generator torques obtained through the latest n-times calculations. The supply of the exciting current If is controlled so that the exciting current does not exceed the maximum exciting current. Accordingly, the exciting current increases gradually from the exciting current If corresponding to a duty ratio of 25% until the output voltage $V_B$ reaches a regulated voltage and the generator torque also increases gradually, thereby stabilizing the idling condition immediately after the starting.

In addition, when the output voltage $V_B$ further rises to exceed the regulated voltage, the output of the voltage comparator 164 is switched into a low level and, hence, a drive signal to be outputted from the AND circuit 166 is also switched into a low level so that the power transistor 160 is placed into the off-condition to reversely lower the output voltage $V_B$.

As mentioned above, in a state where the electrical load or the rotation speed N of the vehicle generator 2 is stable during the idling, the exciting current limiting value Ifmax is set to be slightly larger than the actual exciting current If and the output voltage $V_B$ is controlled to a regulated voltage without exerting influence on the control of the output voltage $V_B$.

(3) In Idling Condition (Activation of Electrical Load)

When an electrical load is activated in the idling condition, the terminal voltage of the battery 3 drops in a moment. At this time, although the output of the voltage comparator 164 is maintained at the high level, the actual exciting current If only increases up to the exciting current limiting value Ifmax. For this reason, the generator torque does not increase immediately and a reduction of the engine revolution stemming from the activation of the electrical load does not occurs in most cases. Following this, the limit torque value Tmax is updated at an interval of set time to increase and, with this situation, the exciting current limiting value Ifmax also increases, and a return to a steady state is made at the time that the output voltage $V_B$ reaches the regulated voltage.

(4) In Idling Condition (Starting of Operation of Auxiliary Device)

Figure 7:
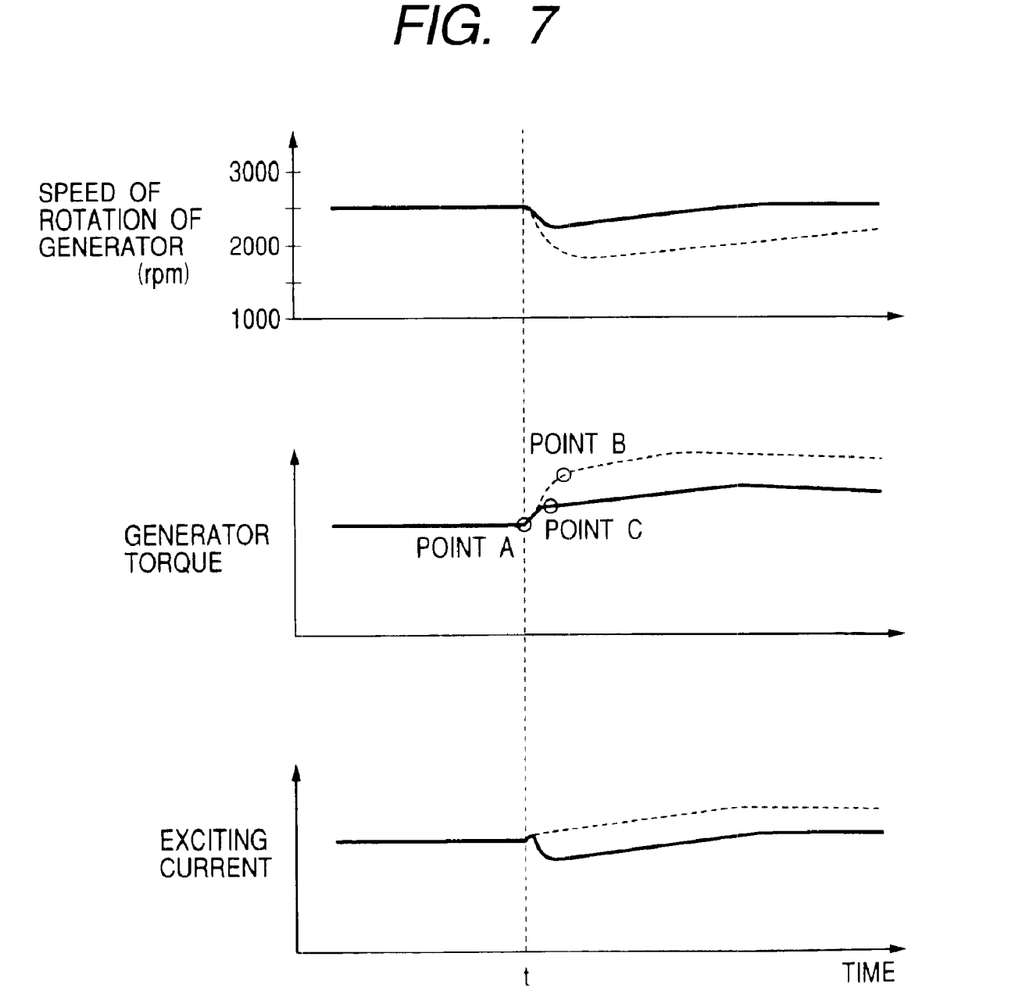
FIG. 7 is an illustration of a behavior in a case in which the engine revolution reduces in an idling condition.
Figure 8:
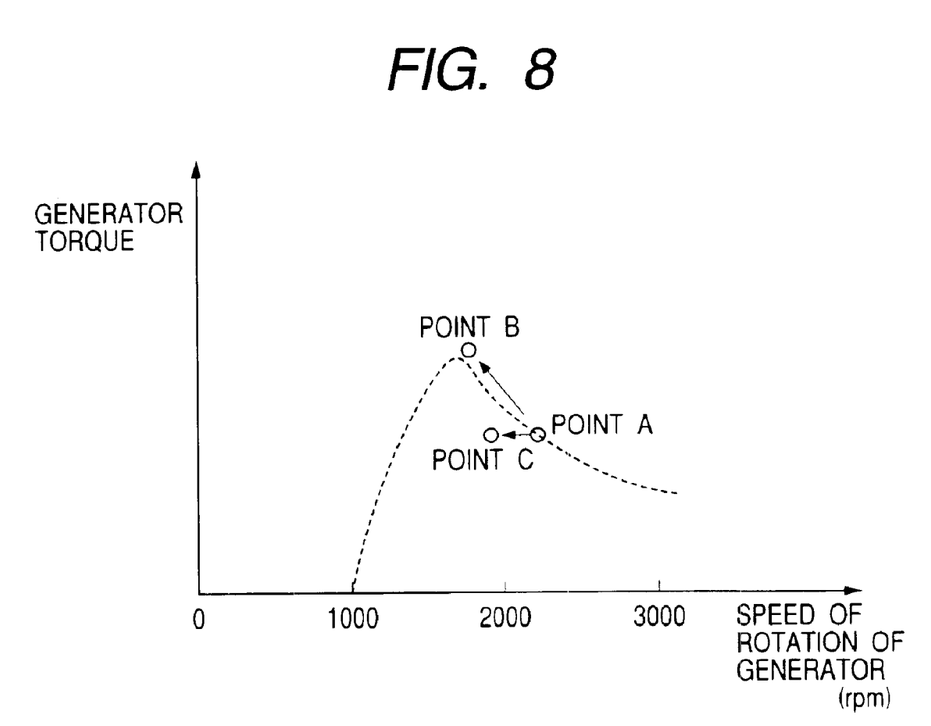
FIG. 8 is an illustration of a behavior in a case in which the engine revolution reduces in an idling condition.

FIGS. 7 and 8 are illustrations of behaviors in a case in which the engine revolution reduces due to operations of other auxiliary devices such as an air conditioner, or the like, in an idling condition. In FIG. 7, characteristic curves indicated by solid lines show variations of a generator rotation speed, a generator torque and an exciting current in the case of the implementation of the torque suppression control according to the present invention while dotted lines show variations thereof in the case of no execution of the torque suppression control. Moreover, in FIG. 8, a characteristic curve indicated by a dotted line represents the relationship between a generator rotation speed and a generator torque in a case in which an exciting current is supplied at a duty ratio of 50% in a state of no implementation of the torque.

As FIG. 7 shows, when an auxiliary device driven by the engine enters an operating condition at the time t, the generator rotation speed begins to reduce. In the case of a conventional vehicle generator which is not under the torque suppression control, as shown in FIG. 8, the generator output lowers in accordance with the reduction of the generator rotation speed and, hence, the exciting current If increases gradually. Accordingly, the generator torque increases with the reduction of the generator rotation speed to promote a reduction of the engine speed so that the engine speed decreases greatly as shifted from a point A to a point B in FIG. 8.

On the other hand, the implementation of the torque suppression control according to the present invention enables the control of the exciting current If so that an increase of the average torque Tav becomes $\alpha$ at most and the exciting current If is decreased when the engine revolution is reduced due to an operation of an auxiliary device, thereby suppressing the increase of the generator torque to a low value. This inhibits the promotion of the reduction of the engine revolution, and the reduction of the engine revolution is suppressible as shifted from the point A to a point C in FIG. 8

(5) In Idling Condition (Discharge from Battery)

In a case in which, in an idling condition, a large electrical load is activated when the battery is in a discharging condition so that the terminal voltage of the battery 3 becomes below 11V, the step 102 in FIG. 6 shows a negative judgment and, hence, the torque detecting/maximum exciting current determining circuit 150 does not implement the exciting current limitation so as not to execute the torque suppression control according to the present invention. This prevents the generator output voltage $V_B$ from further dropping to cause the malfunctions of the various types of electrical loads.

(6) In Running Condition

While the vehicle is running, since the engine revolution increases so that the generator rotation speed N becomes higher than 3500 rpm, the torque detecting/maximum exciting current determining circuit 150 does not perform the exciting current limitation so that the torque suppression control according to the present invention does not take place. Therefore, in a case in which the engine revolution is stable and the torque suppression control is unnecessary, the exciting current control based on the generator output voltage is implemented preferentially, and the supply of a stable operating voltage to an electrical load becomes feasible.

As described above, owing to the implementation of the torque suppression control in the vehicle power generation control apparatus 1 according to this embodiment, even if a variation of the electrical load or a variation of the engine revolution occurs, since the increasing quantity of the generator torque is suppressed to be below a given value, it is possible to prevent the engine revolution from becoming unstable due to an increase in generator torque. In particular, the realization of the stabilization of the engine revolution enables the further reduction of the engine speed in an idling condition, thus achieving further improvement of the fuel consumption.

In addition, by inhibiting the execution of the control for the suppression of the generator torque in a case in which the generator output voltage drops extremely, it is possible to prevent an electrical load from malfunctioning due to a drop of the generator output voltage.

It should be understood that the present invention is not limited to the above-described embodiment, and that it is intended to cover all changes and modifications of the embodiment of the invention herein which do not constitute departures from the spirit and scope of the invention. For example, although in the above-described embodiment the limit torque value Tmax and the exciting current limiting value Ifmax are calculated in the torque detecting/maximum exciting current determining circuit 150 of the vehicle power generation control apparatus 1, it is also appropriate that this function is placed in an external control apparatus such as an engine control apparatus (ECU). That is, the generator rotation speed N, exciting current If and generator output voltage $V_B$ detected in the vehicle power generation control apparatus are conveyed to an external control apparatus to calculate a current limiting value Ifmax, and the calculation result is returned to the vehicle power generation control apparatus 1.

What is claimed is:

1. A power generation control apparatus for a vehicle, which is made to control an output voltage of a vehicle generator by interrupting a current supply to an exciting winding of said vehicle generator, comprising:

exciting current detecting means for detecting an exciting current flowing through said exciting winding;

rotation speed detecting means for detecting a speed of rotation of said vehicle generator;

torque calculating means for calculating a power generation torque of said vehicle generator as a function of the exciting current detected by said exciting current detecting means and the rotation speed detected by said rotation speed detecting means; and exciting current control means for controlling the exciting current to said exciting winding so that a rate of change of the power generation torque calculated by said torque calculating means does not exceed a predetermined value.

2. The apparatus according to claim 1, wherein said exciting current control means controls the exciting current to said exciting winding when an engine of said vehicle is an idling condition.

3. The apparatus according to claim 1, wherein said exciting current control means does not implement the control on said exciting current to said exciting winding when an output voltage of said vehicle generator does not reach a set value.

4. The apparatus according to claim 1, wherein said torque calculating means has a non-volatile memory in which data is writable at least once, said memory storing a table showing the relationship among the exciting current, the rotation speed and the power generation torque.

5. The apparatus according to claim 1, wherein said torque calculating means calculates the power generation torque on the basis of the exciting current detected by said exciting current detecting means, the rotation speed detected by said rotation speed detecting means and the output voltage of said vehicle generator.

* * * * *